(12) United States Patent
Jeffries et al.

(10) Patent No.: US 6,728,253 B1
(45) Date of Patent: Apr. 27, 2004

(54) MIXED QUEUE SCHEDULER

(75) Inventors: Clark Debs Jeffries, Durham, NC (US); Marco C. Heddes, Raleigh, NC (US); Mark Anthony Rinaldi, Durham, NC (US); Michael Steven Siegel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/405,691

(22) Filed: Sep. 24, 1999

(51) Int. Cl.⁷ .............................................. H04L 12/56
(52) U.S. Cl. ...................................... 370/412; 370/429
(58) Field of Search ................................ 370/229–232, 370/235–236, 351, 389, 385.1, 395.21, 395.4–395.43, 395.7–395.72, 412–418

(56) References Cited

U.S. PATENT DOCUMENTS

| | | | | |
|---|---|---|---|---|
| 4,845,710 A | * | 7/1989 | Nakamura et al. | 370/360 |
| 4,970,720 A | * | 11/1990 | Esaki | 370/416 |
| 5,193,090 A | | 3/1993 | Filipiak et al. | 370/94.1 |
| 5,268,900 A | | 12/1993 | Hluchyj et al. | 370/94.1 |
| 5,375,208 A | * | 12/1994 | Pitot | 711/156 |
| 5,640,389 A | | 6/1997 | Masaki et al. | 370/418 |
| 5,689,500 A | | 11/1997 | Chiussi et al. | 370/235 |
| 5,689,508 A | | 11/1997 | Lyles | 370/391 |
| 5,706,288 A | | 1/1998 | Radhakrishnan et al. | 370/418 |
| 5,710,909 A | * | 1/1998 | Brown et al. | 711/170 |
| 5,712,851 A | | 1/1998 | Nguyen et al. | 370/399 |
| 5,734,650 A | | 3/1998 | Hayter et al. | 370/391 |
| 5,757,771 A | | 5/1998 | Li et al. | 370/235 |
| 5,771,234 A | | 6/1998 | Wu et al. | 370/396 |
| 5,790,522 A | | 8/1998 | Fichou et al. | 370/236 |
| 5,796,719 A | | 8/1998 | Peris et al. | 370/231 |
| 6,035,333 A | * | 3/2000 | Jeffries et al. | 370/445 |
| 6,182,176 B1 | * | 1/2001 | Ziegler et al. | 710/112 |
| 6,377,546 B1 | * | 4/2002 | Guerin et al. | 370/230 |

* cited by examiner

*Primary Examiner*—Hassan Kizou
*Assistant Examiner*—David Odland
(74) *Attorney, Agent, or Firm*—Joscelyn G. Cockburn; Bracewell & Patterson LLP

(57) ABSTRACT

A method and system are disclosed for allocating data input bandwidth from a source link to a plurality of N data queues each having a variable occupancy value, $Q_i(t)$, and a constant decrement rate, $D_i$, where i designated the $i^{th}$ queue among the N queues. First, a threshold occupancy value, T, is designated for the N queues. During each time step of a repeating time interval, $\Delta t$, the occupancy value, $Q_i$, is compared with T. In response to each and every of said N data queues having occupancy values exceeding T, pausing data transmission from the source link to the N data queues, such that overflow within the data queues is minimized. In response to at least one of the N data queues having an occupancy value less than or equal to T, selecting one among the N data queues to be incremented, and incrementing the selected data queue, such that underflow of the selected queue is minimized. In the context of scheduling one cell per time step, the value of T is one. Furthermore, the method of the present invention guarantees that output port occupancy shall never, in that context, exceed two cells.

1 Claim, 7 Drawing Sheets

MIXED QUEUE SCHEDULER

BACKGROUND OF THE INVENTION

1. Technical Field

The present invention relates in general to an improved method and system for managing communications networks. In particular, the present invention relates to a method and system for scheduling the arrival rate of data packets among a plurality of data queues. More particularly, the present invention relates to a method and system for allocating bandwidth between memory queues and corresponding output queues having differing service rates. Still more particularly, the present invention provides a selection mechanism by which output queue threshold criteria are compared with current output queue occupancy data to service one among a plurality of data queues during each of a repeating time interval, such that queue underflow and overflow are minimized.

2. Description of the Related Art

In switch design it is necessary to schedule traffic to multiple data ports which may have different output flow rates. In this context, a "data port" may be referred to interchangeably as a "data queue". Similarly, and consistent with conventional queueing theory terminology, the "output flow rate" of a queue may be referred to as the "service rate" of the queue in question. All data in memory exists in fixed cell sizes. Each cell resides within a particular memory queue, and is labeled with a designator that identifies a given output port as its destination. At each time step, a scheduler may either declare a pause (do nothing to any cells) or choose exactly one memory queue, extract the first cell from that queue, and move that cell into the output queue of the same label, as illustrated in FIG. 1.

Furthermore, at each time step some irregular but constant fraction of a cell is taken from each output queue. The irregular function reflects the asynchronous nature of the scheduler and the external media into which output ports feed. To avoid underflow, a fundamental and obviously necessary assumption is that the sum of the output fractions must be less than or equal to one.

To further clarify the scheduler problem, it should be noted that the configuration depicted in FIG. 1 is susceptible to two constraints which must be addressed. The first is underflow which, as the term is utilized herein, refers to a queue that, once started, becomes empty even when data designated for that port is currently available within memory buffers 106. Underflow occurs in the scheme depicted in FIG. 1 when scheduler 102 has begun scheduling a memory queue but then fails to allocate input data from memory buffers 106 to one of output queues 104 at a rate sufficient to compensate for the output flow rate, or queue bandwidth of one of the queues. The problems caused by underflow include degradation in Quality of Service (QoS) guarantees and increased network congestion.

Whereas underflow results in data queues being permitted by scheduler 102 to become empty, overflow results when, in trying to build up an excessive surplus in an output queue, scheduler 102 allocates input data to one of queues 104 at a rate faster than the queue's respective service bandwidth (output flow rate), the queue's occupancy will rise until an unacceptable overflow condition occurs. Like underflow, overflow results in degraded network efficiency and predictability and in increased congestion.

From the foregoing, it can be appreciated that a need exists for a method and system for scheduling the data arrival rate from a single source link to multiple data queues such that the minimum level of occupancy within each of the queues in maximized. Implementation of such a method and system would prevent overflow and underflow from occurring, thereby enhancing the efficiency and reliability of telecommunications networks.

SUMMARY OF THE INVENTION

It is therefore an object of the invention to provide an improved method and system for managing communications networks.

It is another object of the invention to provide a method and system for scheduling the arrival rate of data packets among a plurality of data queues.

It is a further object of the present invention to provide a method and system for allocating bandwidth of a single source link among a plurality of output queues having differing service rates.

It is still another object of the present invention to provide a selection mechanism by which queue threshold criteria are compared with current queue occupancy data to increment one among a plurality of data queues during each of a repeating time interval, such that queue underflow and overflow are minimized.

The above and other objects are achieved as is now described. A method and system are disclosed for allocating data input bandwidth from a source link to a plurality of N data queues each having a variable occupancy value, $Q_i(t)$, and a constant decrement rate, $D_i$, where i designated the $i^{th}$ queue among the N queues. First, a threshold occupancy value, T, is designated for the N queues. During each time step of a repeating time interval, $\Delta t$, the occupancy value, $Q_i$, is compared with T. In response to each and every of said N data queues having occupancy values exceeding T, pausing data transmission from the source link to the N data queues, such that overflow within the data queues is prevented. In response to at least one of the N data queues having an occupancy value less than or equal to T, selecting one among the N data queues to be incremented, and incrementing the selected data queue, such that underflow of the selected queue is prevented. In the context of scheduling one cell per time step, the value of T is one. Furthermore, the method of the present invention guarantees that output port occupancy shall never, in that context, exceed two cells.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

The present invention introduces a new method and system by which the output ports that have differing output flow rates (referred to interchangeably as "service rates") are being served by a scheduler having a given bandwidth.

By maximizing the minimum queue occupancy within each port, the present invention ensures that underflow will not occur provided the input bandwidth is not less than the cumulative output bandwidth. Also, by incorporating a pre-determined cap occupancy limit into the formula of the present invention, overflow is also avoided.

The service rates of the output queues are all constants between 0 and 1 cell per time step. Thus, in a time step, fractions of cells, on average, are removed from output queues. Suppose inexhaustible traffic exists starting at time zero for all memory queues. For the purpose of smooth and efficient operation, it is generally desirable that, once started, no output queue ever subsequently underruns (has less than its fraction of a cell available when a service is provided). Furthermore, it is also desirable that the queues never overflow (never exceed a given threshold).

Figure 2:
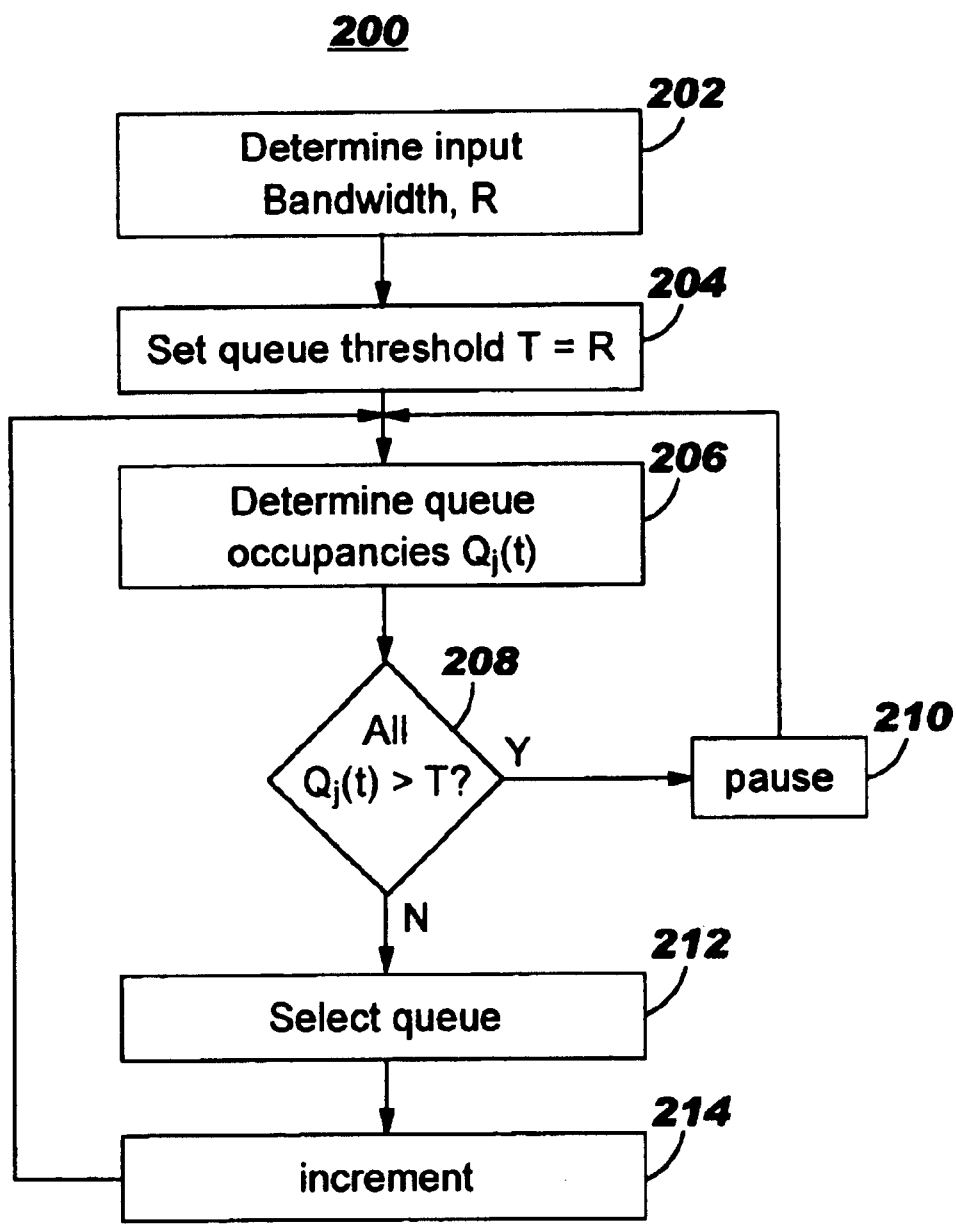
FIG. 2 is a flow diagram depicting a scheduling method in accordance with the present invention.

With reference now to the figures, in particular with reference to FIG. 2, there is depicted a bandwidth allocation methodology 200 in accordance with the present invention. As illustrated in FIG. 2, method 200 is comprises a series of steps 202 through 214 which describe actions performed during a single iteration of the scheduler of the present invention. That is to say, a "scheduling" is a repetitive task comprising the series of actions embodied in either steps 202 through 214, or steps 202 through 210 over a given pre-defined time interval Δt. The resumption of the process from either step 214 or step 210 to step 206 designates commencement of the next time interval.

The process begins at step 202 which depicts determination of the input flow rate from the scheduler to the output queues. For ease of reference, R, will designate the input bandwidth at which the scheduler operates. The input bandwidth, R, is the number of cells which the scheduler can process per time step Δt. Commonly, R is one cell per time step but any positive input bandwidth is possible. After input bandwidth has been determined, a queue threshold, T, is set as illustrated at step 204. In the depicted example T has been set to R, and as explained further below, this setting ensures that the data queues will never underflow (contains less than the corresponding cell fraction at the instant a service is possible after attaining non-zero occupancy).

The process proceeds to steps 206 and 208 which depict a preliminary comparison of the occupancy level of each data queue having queue threshold level, T. As seen in steps 208 and 210, if the queue occupancy level, $Q_i(t)$, of a given queue, i, is greater than the queue threshold, T, the scheduler will pause for the duration of the current time interval (Δt) and the process will resume at step 206. Such "pause intervals" are occasionally required to compensate for the extent to which the input flow rate from the scheduler exceeds the total output bandwidth from the all queues. It should be noted, that in the special case that the total output bandwidth is R, no pause will occur after all queues have started. This output bandwidth is the sum of the service rates of all queues to which the scheduler delivers data. If the assessment depicted at steps 206 and 208 reveals that at least one of the queues has an occupancy level at time t that is less than the threshold level, T, one queue among all N queues will be selected and incremented as depicted at steps 212 and 214. The following psuedocode algorithm may be employed by a data scheduler to allocate bandwidth in accordance with the method depicted in FIG. 2.

If all running queues have $Q_i(t)>T$, then increment no running queue and declare a pause.

Else, from the set of queues with $Q_i(t)<\_T$ and with minimal $d_i(t)$, increment the one with the smallest index.

Those skilled in the art will recognize this policy as the well-known "Earliest Deadline First" policy. As explained in further detail below, the mixed queue scheduler of the present invention incorporates this policy into an improved methodology which specifies a queue startup procedure with underflow and overflow guarantees.

Figure 3:
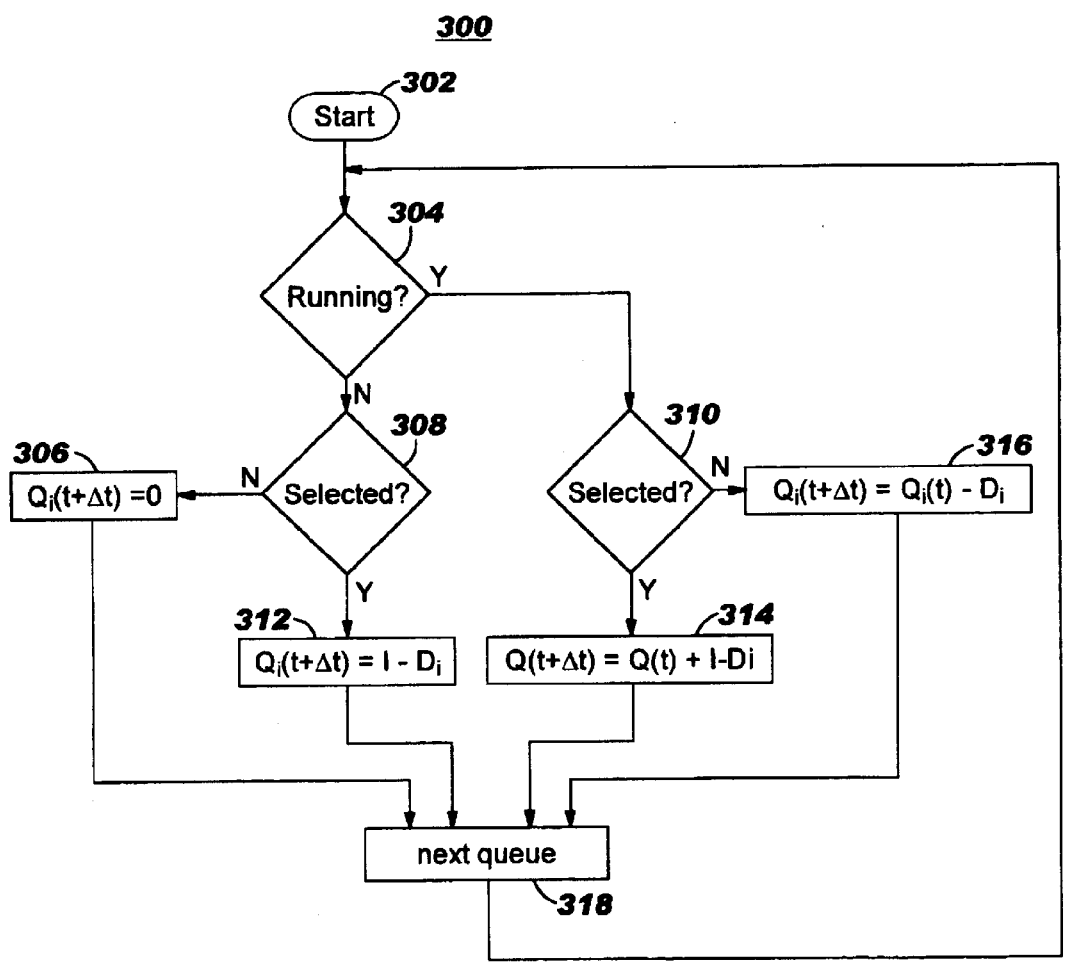
FIG. 3 is a high level logic diagram illustrating incrementation of queues occupancy levels in accordance with the method and system of the present invention.

With reference now to FIG. 3 in which a high level logic diagram 300 is depicted comprising an algorithm for constructing a queue vector in accordance with the present invention. As seen in FIG. 3, the algorithm begins at step 302 and proceeds to inquiry step 304 which depicts a determination of whether a given queue is currently active or "running" (having been served and having had a non-zero occupancy). One possible method for determining whether a given queue is running is to verify a non-zero queue occupancy level. Another method is depicted in the following psuedocode that is incorporated in a preferred embodiment of the present invention. In this method the previous "choice" vectors, $C_i$, for queue i over all previous time intervals are examined to see whether or not queue i has been previously selected to be incremented. If queue i has never been incremented, than it is assumed at step 304 that queue i is not running.

The following psuedocode may be utilized in a preferred embodiment of the present invention to implement the scheduling techniques and methods depicted in FIGS. 2, 3, 4, 5, and 6. The operating variables within the following psuedocode are defined as follows:

C is an N-element choice vector, composed of elements $C_1$, $C_2$, ... $C_N$, that for each time step designates which data queue will be served by the scheduler.

R is the total service rate, or input bandwidth, which is equal, to the number of cells that can be delivered by the scheduler during a unit time step Δt.

D is an N-element decrement vector that for each queue i, designates a decrement, or service rate $D_i$, that is, the fraction between 0 and 1 of a cell removed from data queue i at each time step Δt.

Q is an N-element queue occupancy vector, composed of elements $Q_1, Q_2, ... Q_N$ that, for a given queue i, indicates the level of occupancy, $Q_i(t)$, at time t.

$d_i$ is a decrement multiple for queue i.

K is an N-element compare vector that for each queue i, designates a compare value $K_i$.

S is a single element saturation vector that for each time step, indicates whether a pause will be declared. Initially, $S(0)=1$ while all $C_i(0)$, $d_i(0)$, $K_i(0)$, and $Q_i(0)=0$.

TABLE 1

```
C₁(t + Δt) = S(t) *if [d₁(t) = min{Kⱼ(t)}, then 1, else 0]5
C₂(t + Δt) = S(t) * (1 - C₁(t + Δt)) *if [d₂(t) = min{Kⱼ(t)}, then 1,
else 0]                        10
C₃(t + Δt) = S(t) * (1 - C₁(t + Δt)) * (1 - C₂(t + Δt)) *if [d₃(t) =
min{Kⱼ(t)}, then 1, else 0]    15
    .
    .
    .
Cₙ(t + Δt) = S(t) * (1 - C₁(t + Δt)) * (1 - C₂(t + Δt)) *...* (1 - Cₙ₋₁
(t + Δt) *if [dₙ(t) = min{Kⱼ(t)},           25
    then 1, else 0]                                      30
Qᵢ(t + Δt) = if [all previous Cᵢ = 0 and Cᵢ(t + Δt) = 0, then 0,
                                 35
    else Qᵢ(t) - Dᵢ + Cᵢ(t + Δt) *R]                     40
dᵢ(t + Δt) = if [all previous Cᵢ = 0 and Cᵢ(t + Δt) = 0, then
R/Dᵢ, else Qᵢ(t)/Dᵢ]           45
Kᵢ(t + Δt) = if [Qᵢ(t + Δt) > T, then L/Dᵢ, else dᵢ(t + Δt)] 50
S(t + Δt) = if [all Qᵢ(t + Δt) <_T, then 1, else 0]      55
```

Initially, $C_i(0)$, $d_i(0)$, $K_i(0)$, and $Q_i(0)$ are all initialized to zero and $S(0)$ is set to 1. Vectors C, Q, d, K, and S are computed and updated at each unit time step of the psuedocode. For the algorithm described above, and with reference to FIGS. 2, 3, 4, 5, and 6, overflow as well as underflow protection is guaranteed. If the pre-determined queue threshold, T, is set equal to R (the number of cells that can be processed at each time step $\Delta t$ from the source link), then the upper bound on the size of queue j will be $2R-D_j$. Empirical evidence proves this true as illustrated in FIG. 7 and the explanation is as follows. The bound on any net increment of queue i is $R-D_i$. If the queue occupancy of queue i, $Q_i(t)$ is greater than R, then the element within compare vector $K(t)$ corresponding to queue i, $K_i(t)$, will equal the overflow limit, L, divided by $D_i$. In one embodiment of the present invention, L may be computed in accordance with the relation:

$$L = C^* \max\{D_i\}/\min\{D_i\}$$

wherein C is the designated queue threshold and $\{D_i\}$ is comprised of the elements within decrement vector D, as defined above.

Since no queue can be incremented unless the saturation flag $S(t)$ is 1, some queues, j, will have occupancies less than or equal to input flow rate, R. Therefore, since the compare values $K_j(t) = Q_j(t)/D_j$, $K_j(t)$ must be less than or equal to $R/D_j$. Thus the specification of L implies $d_i(t)$ cannot be the minimum of all $\{K_j(t)\}$ and so queue i with $Q_i(t) > R$ cannot be incremented. Therefore, only a queue with $Q_i(t)$ less than or equal to R can be incremented. Since the net increment for queue j is $R-D_j$, the maximum queue size attainable is $2R-D_j$.

Underflow protection is also provided by implementation of the scheduling method illustrated in algorithm above. For the above starting and running algorithm with R=C, a mathematically provable lower bound on all queue occupancies is 0.

Returning to FIG. 3, if a determination is made at step 304 that queue i is running, the method proceeds to inquiry step 310 at which a determination is made whether or not queue i has been selected by a choice vector generated at time step $t+\Delta t$. The manner in which choice vector, C, is generated and the significance thereof are discussed in further detail with reference to FIG. 6. As illustrated at steps 304, 310 and 314, If queue i is determined to be both running and selected at time step $t+\Delta t$, the scheduler will increment queue i at time step $t+\Delta t$ and record the occupancy of queue i in accordance with the relation:

$$Q_i(t+\Delta t) = Q_i(t) + R - D_i$$

wherein $Q_i(t)$ designates queue i's occupancy at the previous time interval, t, R designates the amount of increment, and $D_i$ is the service, or decrement rate of queue i. The quantity $(R-D_i)$ therefore indicates the net increase from time t to time $t+\Delta t$ when queue i is incremented in accordance with the scheduler of the present invention. If queue i is running but not selected for incrementation, queue i is merely decremented in accordance with its service rate $D_i$ as depicted at steps 304, 310, and 316. The process embodied in steps 304, 310, 314, and 316 is performed on each of the N queues at each time step $\Delta t$ as shown at step 318.

If queue i is found not running at step 304, an inquiry into whether queue i has been selected for incrementation will again follow as illustrated at step 308. As seen at steps 304, 308, and 312, if queue i is not running but has been selected for incrementation, queue i will be incremented in accordance with the relation:

$$Q_i(t+\Delta t) = R - D_i$$

wherein R is again the value of positive increment and $D_i$ designates the unit decrement. If queue i is not running and has not been selected for incrementation, its queue will remain zero as depicted at steps 304, 308, and 306.

Figure 4:
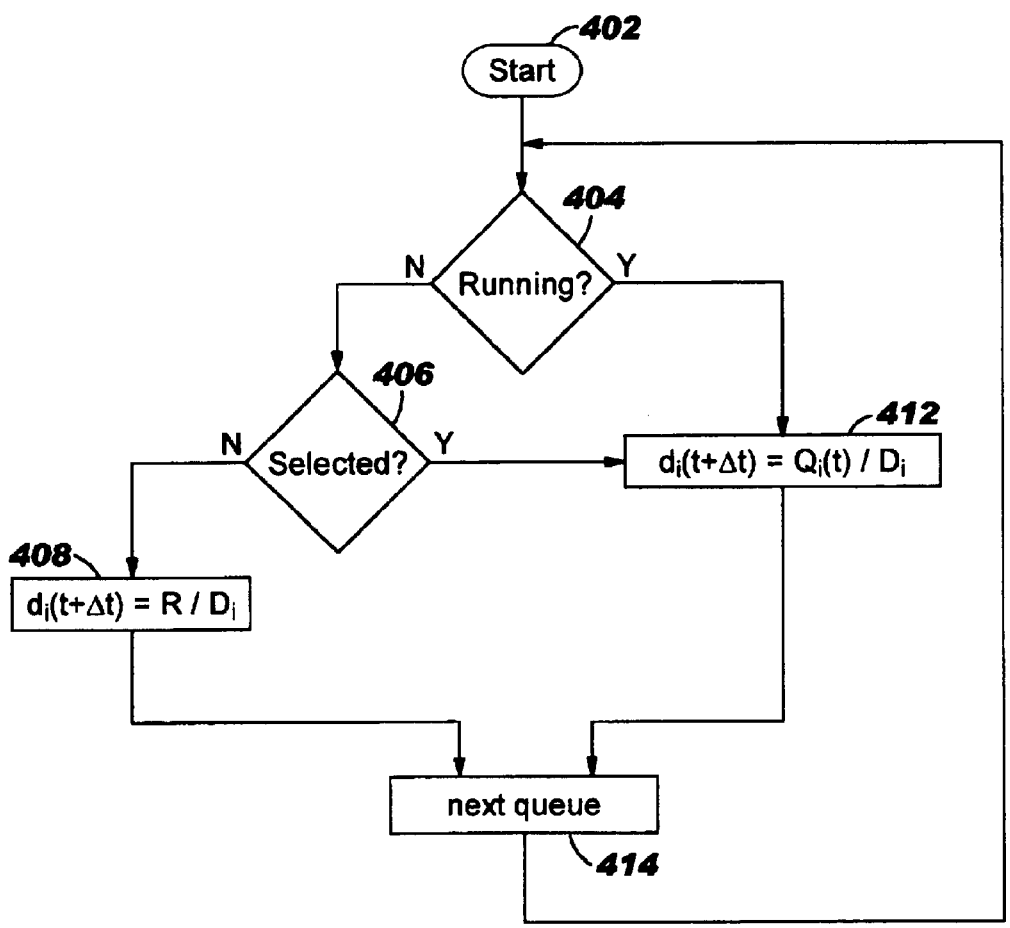
FIG. 4 is a high level logic diagram depicting construction of a decrement vector in accordance with the method and system of the present invention.

Turning now to FIG. 4, there is illustrated an exemplary algorithm 400 by which a decrement multiple, d, for each of the data queues may be derived and dynamically adjusted. At each repeating time interval, $\Delta t$, the decrement multiple for each of N data queues is computed as explained herein and compiled within an N-element "decrement vector". Each element of this decrement vector is a decrement multiple associated with a particular queue. The decrement vector is updated every time interval, $\Delta t$, and utilized to supply compare parameters for use by the scheduler as explained with reference to the following figures. Algorithm 400 commences at step 402 which depicts startup at a time at which the queues may or may not have zero occupancy. Next, a determination is made whether a given queue is currently active or running. This step is performed in a manner with inquiry step 304 of FIG. 3.

The immediate consequence of a determination that queue i is not running is to determine whether queue i is currently (at time $t+\Delta t$) selected for incrementation as depicted at step 406. If queue i is not currently selected to be incremented, the decrement multiple, $d_i$, will be obtained in accordance with the relation:

$$d_i(t+\Delta t) = R/D_i$$

wherein R designates the input flow rate of the source link, and $D_i$ designates the service rate for queue i. If queue i is either running or is not running but has been currently selected for incrementation at time t+Δt, the decrement multiple will be obtained in accordance with the relation:

$$d_i(t+\Delta t)=Q_i(t)/D_i$$

wherein $Q_i(t)$ is the level of queue occupancy recorded during the previous time increment (time t) and recorded in occupancy vector Q(t) described in further detail with reference to FIG. 5. In either case, after decrement multiple $d_i(t+\Delta t)$ has been set, the method proceeds to step 414 which depicts selecting the next queue for which a decrement multiple must be obtained during time interval t+Δt.

Figure 1:
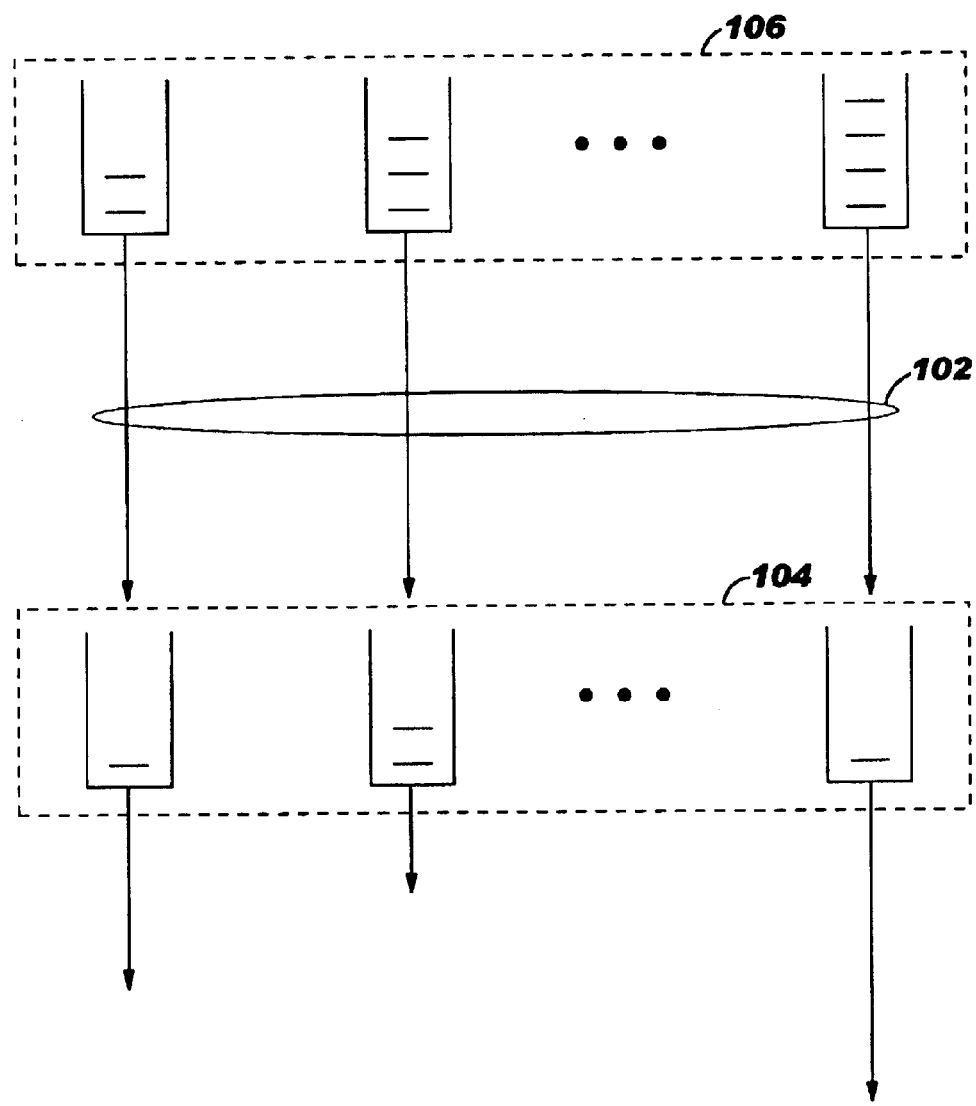
FIG. 1 illustrates a switch queue scheduler in which the method and system of the present invention may be implemented.
Figure 5:
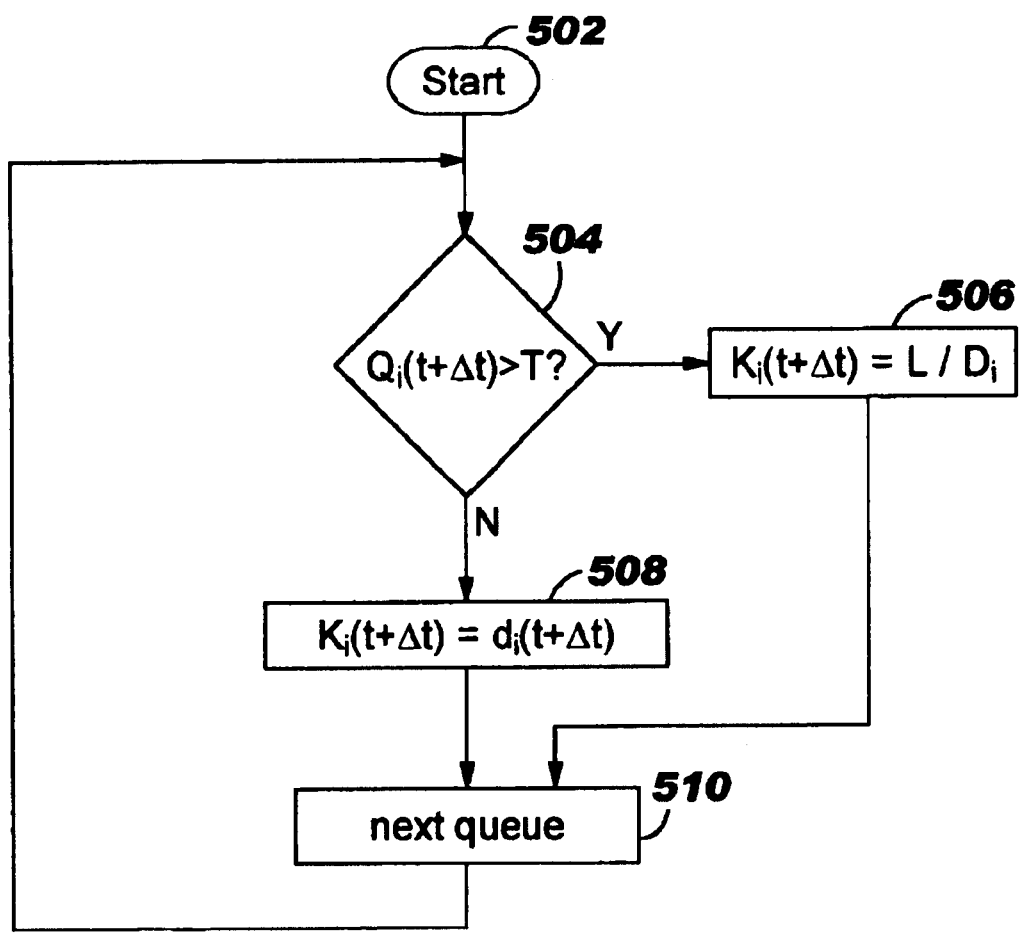
FIG. 5 is a high level logic diagram illustrating construction of a compare vector in accordance with the method and system of the present invention.

Turning now to FIG. 5, a methodology 500 for constructing a compare vector K(t+Δt) in accordance with the present invention is depicted. Like queue vector Q, and decrement vector d, compare vector K is an N-element vector composed of elements corresponding to each of N queues. As described in further detail with reference to FIG. 6, each decrement multiple within decrement multiple d, is compared with all elements within the compare vector in order to determine which queue will be incremented by an increment R. Method 500 begins at startup step 502 and proceeds to inquiry step 504 at which the occupancy $Q_i$, for queue i at time t+Δt is compared with a pre-designated queue threshold, cap C. As depicted at steps 504 and 506, if $Q_i(t+\Delta t)$ is greater than cap T, a compare element, $K_i(t+\Delta t)$, corresponding to queue i is obtained in accordance with the relation:

$$K_i(t+\Delta t)=L/D_i$$

wherein L designates a pre-defined overflow limit that is obtained as described with reference to FIG. 1. Specifically, $L=T^*\max\{D_i\}/\min\{D_i\}$. If Q(t+Δt) is less than or equal to T, $K_i(t+\Delta t)$ is set equal to its corresponding decrement multiple value $d_i(t+\Delta t)$ as illustrated at steps 504 and 508. The setting of compare values embodied in steps 504, 506, and 508, is performed for each of N queues during each time increment Δt as depicted at step 510.

Figure 6:
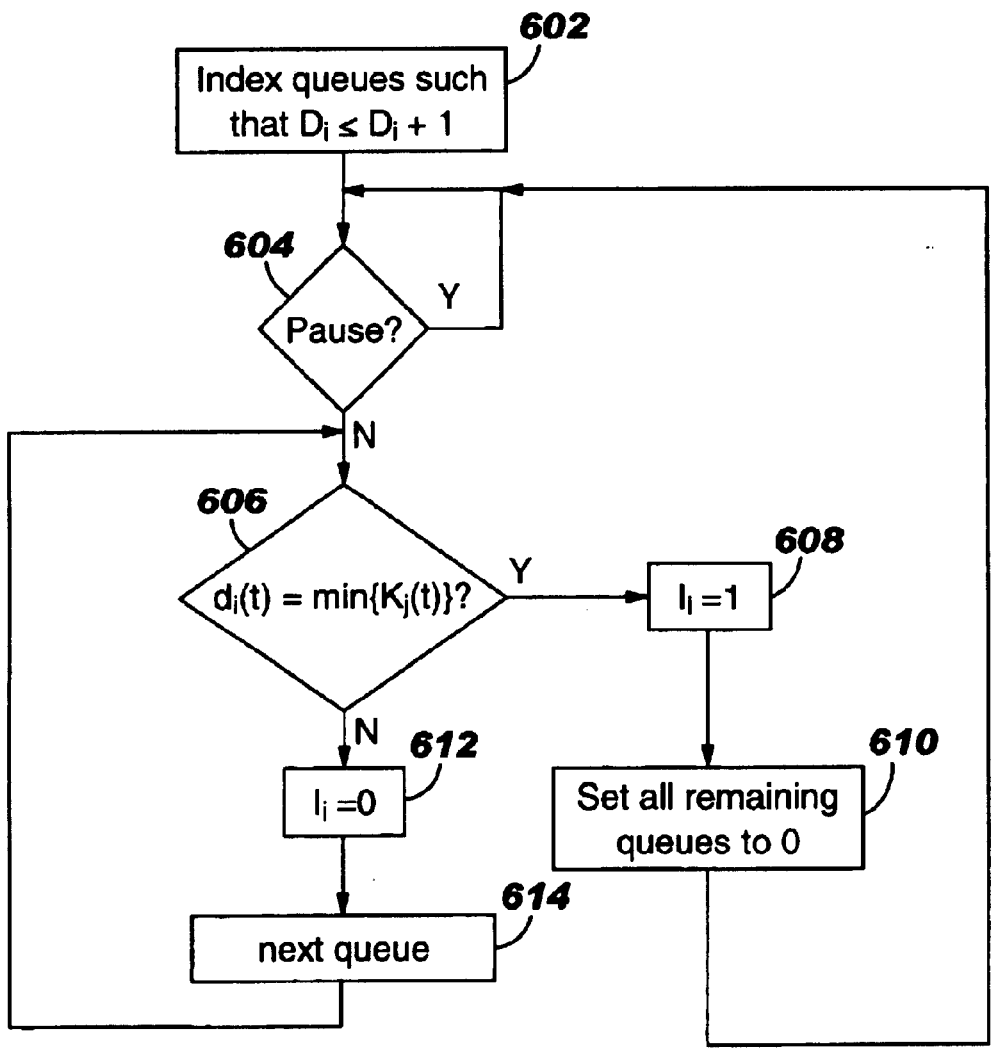
FIG. 6 is a high level logic diagram illustrating the process by which a queue is selected for incrementation in accordance with the method and system of the present invention.
Figure 7:
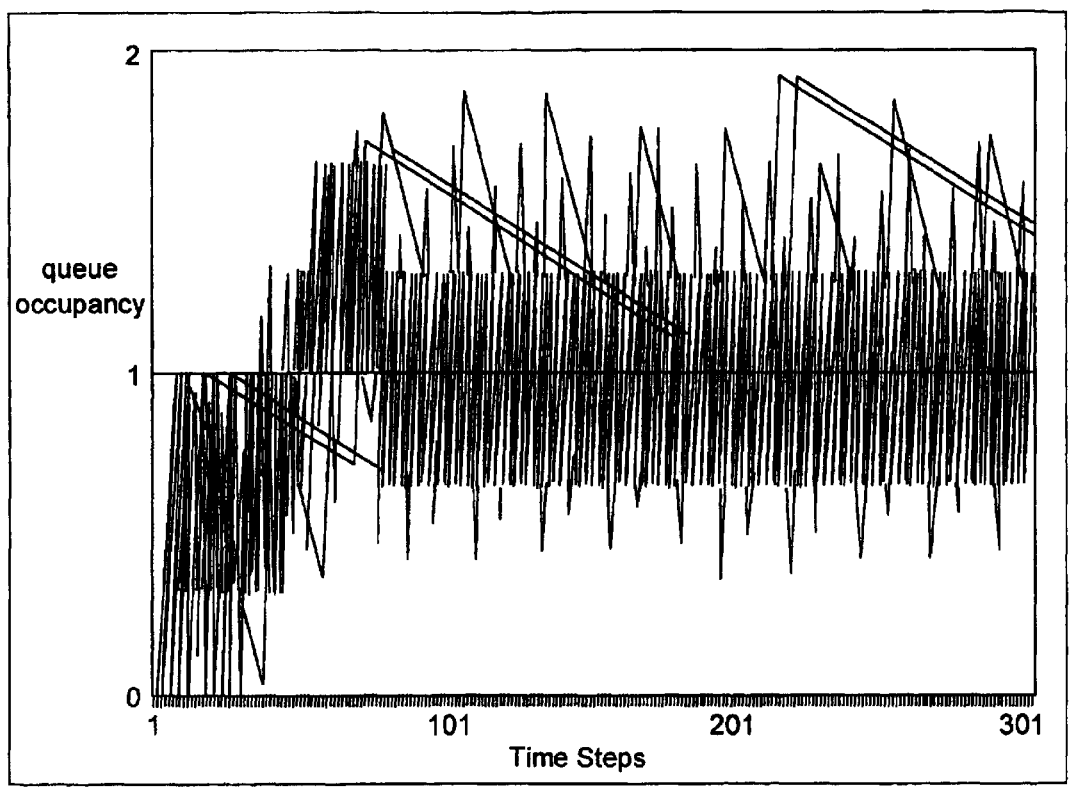
FIG. 7 is a graphical representation of simulation results depicting allocation of input bandwidth among a mix of output queues that avoids underflow and overflow.

The culmination of selecting a queue to be incremented at a given time step t+Δt as shown at step 212 of FIG. 2 is it illustrated as algorithm 600 of FIG. 6. In accordance with the embodiment depicted in accompanying pseudo-code, the selection of a single queue for incrementation is embodied within an N-element choice vector, C. For each time step Δt, a single choice vector C(t+Δt) will be generated by N iterations of steps 606, 608, 610, 612, and 614.

Algorithm 600 commences at step 602 at which all N queues are indexed in order of non-increasing service rates. Algorithm 600 proceeds to inquiry step 604 at which the scheduler determines if a pause has been declared as per steps 206, 208, and 210 of FIG. 2. While the scheduler is paused no data will be delivered to any of the data queues. When the pause has cleared, an N-element choice vector, C, is generated as depicted at steps 606 through 614. First, as illustrated at step 606, a decrement multiple, $d_i$, within decrement vector d, is compared with all N compare elements within compare vector K. If $d_i$ is less than or equal to the smallest value within compare vector K, queue i is selected to be incremented at the next upcoming time step. As illustrated at step 610, and as a direct consequence of a queue i being selected for incrementation, the scheduler will automatically eliminate all remaining queues from consideration since only one queue may be incremented per time step. If, as depicted at steps 606 and 612, $d_i$ is not equal to the minimum value within K, queue i is eliminated from consideration.

As per the indexing performed as depicted at step 602, decrement multiples are selected sequentially from decrement vector d in order of non-increasing service rate. For an indexing scheme in which "i" is chosen as the index, then decrement values $d_j$ will be chosen such that $d_i$ is examined prior to $d_i$ where $D_i <\_D_{i+1}$.

FIG. 7 is a graphical representation of simulation results 700 depicting allocation of input bandwidth among a mix of output queues that avoids underflow and overflow in accordance with the mixed queue scheduler of the present invention. The simulation results 700 of FIG. 7 include six output service rates: 0.333, 0.333, 0.207, 0.033, 0.005, and 0.005. The sum of the output service rates is 0.910<_1. It should be noted that once started by the scheduler, no output queue ever exceeds two cells. Furthermore, every output queue at every time step has a fractional cell available for service, that is, no output queue, once started by the scheduler, experiences underflow. The example depicted in FIG. 7 includes 301 time steps (time units at which the scheduler allocates a unit of data two exactly one output data queue).

It is important to note that, while the present invention has been, and will continue to be, described in the context of a fully functional telecommunications subsystem, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links.

Preferred implementations of the invention include implementations as a computer system programmed to execute the method or methods described herein, and as a program product. According to the computer system implementation, sets of instructions for executing the method and methods are resident in RAM of one or more computer systems configured generally as described above. Until required by the computer system, the set of instructions may be stored as a computer-program product in another computer memory, for example, in a disk drive (which may include a removable memory such as an optical disk or floppy disk for eventual utilization in disk drive).

The computer-program product can also be stored at another computer and transmitted when desired to the user's workstation by a network or by an external communications network. One skilled in the art can appreciate that the physical storage of the sets of instructions physically a changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements. Thus, a method for implementing the present invention as depicted in Table 1 and FIGS. 2, 3, 4, 5, and 6 can be accomplished with a computer-aided device. In such a method, data stored in a memory unit of a data-processing system such as a data-processing system, can represent steps in a method for implementing a preferred embodiment of the present invention.

While the invention has been particularly shown as described with reference to a preferred embodiment, it will be understood by those skilled in the art that various changes in form and detail may be made therein without departing from the spirit and scope of the invention. It is therefore contemplated that such modifications can be made without departing from the spirit or scope of the present invention as defined in the appended claims.

APPENDIX A
Scheduling Algorithm:

For the following scheduling algorithm:

C is an N-element choice vector, composed of elements $C_1, C_2, \ldots C_N$, that for each time step designates which data queue will be served by the scheduler.

R is the service rate, or input bandwidth, which is equal to the number of cells that can be delivered by the scheduler during a unit time step $\Delta t$.

D is an N-element decrement vector that for each queue i, designates a decrement, or service rate $D_i$.

Q is an N-element queue occupancy vector, composed of elements $Q_1, Q_2, \ldots Q_N$ that, for a given queue i, indicates the level of occupancy, $Q_i(t)$, at time t.

$d_i$ is a decrement multiple for queue i.

K is an N-element compare vector that for each queue i, designates a compare value $K_i$.

S is a single element saturation vector that for each time step, indicates whether a pause will be declared.

Initially, define $S(0)=1$ while all $C_i(0)$, $d_i(0)$, $K_i(0)$, and $Q_i(0)=0$.

At each such time some other queue is chosen even though at the time just before the first value all other queues had values $R+\epsilon_i \geq R$. Let the labels of the chosen queues be 1,2, . . . , p. Some of these queues might be chosen, incremented, then chosen again, and so on. Other queues might be running but not chosen up to and at the underflow of queue a.

If queue j is chosen $b_j$ times, then the last time it is chosen at step c, it satisfies $[b_j R+\epsilon_i-cD_i]/D_i < \_[R-cD_a]/D_a$ so that $D_a < \_D_i/b_j$. Also, the underflow step $R-(m+1)D_a < 0$ yields $D_a > R/[m+1]$. Finally, R is necessarily larger than the sum of the queue drain rates, such that:

$$R \geq D_1 + D_2 + \ldots + D_p + D_a =$$
$$D_1/b_1 + \ldots + D_1/b_1 + D_2/b_2 + \ldots + D_2$$
$$/b_2 + \ldots + D_p/b_p + \ldots + D_p/b_p + D_a \geq$$
$$D_a + \ldots + D_a + D_a + \ldots + D_a + \ldots + D_a$$
$$+ \ldots + D_a + D_a >$$
$$R/(m+1) + \ldots + R/(m+1) + R(m+1) + \ldots +$$
$$R/(m+1) + \ldots + R/(m+1) = R$$

This contradiction proves that a queue cannot underflow immediately after starting, that is, without being incremented at least once.

```
C₁(t + Δt) = S(t) *if[d₁(t) = min{K_j(t)}, then 1, else 0]
C₂(t + Δt) = S(t) * (1 - C₁(t + Δt)) *if[d₂(t) = min{K_j(t)}, then 1,
else 0]
C₃(t + Δt) = S(t) * (1 - C₁(t + Δt)) * (1 - C₂(t + Δt)) *if[d₃(t) =
min{K_j(t)}, then 1, else 0]
.
.
.
C_N(t + Δt) = S(t) * (1 - C₁(t + Δt)) * (1 - C₂(t + Δt)) *...*(1 - C_{N-1}
(t + Δt) *if[d_N(t) = min{K_j(t)},
then 1, else 0]
Q_i(t + Δt) = if [all previous C_i = 0 and C_i(t + Δt) = 0, then 0,
else Q_i(t) - D_i + C_i(t + Δt)*R]
d_i(t + Δt) = if [all previous C_i = 0 and C_i(t + Δt) = 0, then
R/D_i, else Q_i(t)/D_i]
Ki(t + Δt) = if [Q_i(t + Δt) > T, then L/D_i, else d_i(t + Δt)]
S(t + Δt) = if [all Q_i(t + Δt)<_T, then 1, else 0]
```

The bound on any net increment of queue i is $R-D_i$. If the queue occupancy of queue i, $Q_i(t)$ is greater than R, then the element within compare vector K(t) corresponding to queue i, $K_i(t)$, will equal the overflow limit, L, divided by $D_i$. In one embodiment of the present invention, L may be computed in accordance with the relation:

$$L=T^* \max\{D_i\}/\min\{D_i\}$$

wherein T is the designated queue threshold and $\{D_i\}$ is comprised of the elements within decrement vector D, as defined above.

Theorem. For the above starting and running algorithm with T=R, a lower bound on all queue lengths is 0.

Proof. Suppose the theorem is false. Let "a" be the label of the queue which first underflows. Suppose further that the underflow occurs immediately after queue a is started, that is, without ever incrementing queue a. Therefore the values of $Q_a$, starting with the first value upon being chosen, are of the form:

$R-D_a, R-2D_a, R-3D_a \ldots R-mD_a > 0$, then $D_a < 0$.

For the purpose of discussion, label the above steps 1, 2, . . . , m, m+1.

If a queue a is incremented, say, x times, then a sequence of steps from start to underflow of queue a could be labeled as follows:

. . . $R-D_a, R-2D_a, R-3D_a, \ldots, xR-mD_a > 0$, then $xR-(m+1)D_a < 0$.

The above line of reasoning holds if every instance of $D_a$ with $D_a/x$.

An implication of the Theorem is that if the above starting and running algorithm utilizes T=R, then all queues start and run after finite time. By selecting T to be less than the value of R often results in shorter time before all queues are running (at the expense of losing the guarantee of no underflow). This is especially true if the sum of the decrements is significantly less than R. If the occasional underflow could be tolerated, then dynamically selecting T as a fraction of R would be an effective method of enhancing starting performance for systems, which frequently start and stop session queues. Suppose the memory service capacity R is one cell per time step. Suppose the system has six output queues which are served at the rates 0.333, 0.333, 0.207, 0.033, 0.005, and 0.005 cells per time step for a total of $0.916<1=R$. The above scheduling algorithm starting at time 0 has all queues running at step 23. After starting, no output queue ever underflows or ever exceeds two cells. Queue occupancy levels for the above-mentioned six queues over the first 35 time steps are illustrated in Appendix B. It should be noted that since the aggregate output bandwidth from all six data queues (0.916) is relatively close to the scheduler input bandwidth (1), no pauses occur within the first 35 time steps. FIG. 7 is a graphical representation of the queue occupancies over 301 time steps for the six queues being served in accordance with the scheduling method described with reference to Appendix A and Appendix B.

APPENDIX B

| step | Choice vector components $C_i(t)$, $I = 1 \ldots 6$ | | | | | | pause? | Queue occupancy $O_i(t)$, $I = 1 \ldots 6$ | | | | | | $S(t)$ |
|---|---|---|---|---|---|---|---|---|---|---|---|---|---|---|
| 0  | 0 | 0 | 0 | 0 | 0 | 0 | 1 | 0     | 0     | 0     | 0     | 0    | 0    | 1 |
| 1  | 1 | 0 | 0 | 0 | 0 | 0 | 0 | 0.667 | 0     | 0     | 0     | 0    | 0    | 1 |
| 2  | 0 | 1 | 0 | 0 | 0 | 0 | 0 | 0.333 | 0.667 | 0     | 0     | 0    | 0    | 1 |
| 3  | 1 | 0 | 0 | 0 | 0 | 0 | 0 | 1     | 0.333 | 0     | 0     | 0    | 0    | 1 |
| 4  | 0 | 1 | 0 | 0 | 0 | 0 | 0 | 0.667 | 1     | 0     | 0     | 0    | 0    | 1 |
| 5  | 0 | 0 | 0 | 0 | 0 | 0 | 0 | 0.333 | 0.667 | 0.793 | 0     | 0    | 0    | 1 |
| 6  | 1 | 0 | 0 | 0 | 0 | 0 | 0 | 1     | 0.333 | 0.585 | 0     | 0    | 0    | 1 |
| 7  | 0 | 1 | 0 | 0 | 0 | 0 | 0 | 0.667 | 1     | 0.378 | 0     | 0    | 0    | 1 |
| 8  | 0 | 0 | 0 | 1 | 0 | 0 | 0 | 0.333 | 0.667 | 0.171 | 0.967 | 0    | 0    | 1 |
| 9  | 0 | 0 | 1 | 0 | 0 | 0 | 0 | 6E-16 | 0.333 | 0.963 | 0.933 | 0    | 0    | 1 |
| 10 | 1 | 0 | 0 | 0 | 0 | 0 | 0 | 0.667 | 6E-16 | 0.756 | 0.9   | 0    | 0    | 1 |
| 11 | 0 | 1 | 0 | 0 | 0 | 0 | 0 | 0.333 | 0.667 | 0.549 | 0.867 | 0    | 0    | 1 |
| 12 | 1 | 0 | 0 | 0 | 0 | 0 | 0 | 1     | 0.333 | 0.341 | 0.833 | 0    | 0    | 1 |
| 13 | 0 | 1 | 0 | 0 | 0 | 0 | 0 | 0.667 | 1     | 0.134 | 0.8   | 0    | 0    | 1 |
| 14 | 0 | 0 | 1 | 0 | 0 | 0 | 0 | 0.333 | 0.667 | 0.927 | 0.767 | 0    | 0    | 1 |
| 15 | 1 | 0 | 0 | 0 | 0 | 0 | 0 | 1     | 0.333 | 0.719 | 0.733 | 0    | 0    | 1 |
| 16 | 0 | 1 | 0 | 0 | 0 | 0 | 0 | 0.667 | 1     | 0.512 | 0.7   | 0    | 0    | 1 |
| 17 | 0 | 0 | 0 | 0 | 1 | 0 | 0 | 0.333 | 0.667 | 0.305 | 0.667 | 1    | 0    | 1 |
| 18 | 1 | 0 | 0 | 0 | 0 | 0 | 0 | 1     | 0.333 | 0.097 | 0.633 | 0.99 | 0    | 1 |
| 19 | 0 | 0 | 1 | 0 | 0 | 0 | 0 | 0.667 | 1E-15 | 0.89  | 0.6   | 0.99 | 0    | 1 |
| 20 | 0 | 1 | 0 | 0 | 0 | 0 | 0 | 0.333 | 0.667 | 0.683 | 0.567 | 0.98 | 0    | 1 |
| 21 | 1 | 0 | 0 | 0 | 0 | 0 | 0 | 1     | 0.333 | 0.475 | 0.533 | 0.97 | 0    | 1 |
| 22 | 0 | 1 | 0 | 0 | 0 | 0 | 0 | 0.667 | 1     | 0.268 | 0.5   | 0.97 | 0    | 1 |
| 23 | 0 | 0 | 0 | 0 | 0 | 1 | 0 | 0.333 | 0.667 | 0.061 | 0.467 | 0.96 | 1    | 1 |
| 24 | 0 | 0 | 1 | 0 | 0 | 0 | 0 | 1E-15 | 0.333 | 0.853 | 0.433 | 0.96 | 0.99 | 1 |
| 25 | 1 | 0 | 0 | 0 | 0 | 0 | 0 | 0.667 | 1E-15 | 0.646 | 0.4   | 0.95 | 0.98 | 1 |
| 26 | 0 | 1 | 0 | 0 | 0 | 0 | 0 | 0.333 | 0.667 | 0.439 | 0.367 | 0.95 | 0.98 | 1 |
| 27 | 1 | 0 | 0 | 0 | 0 | 0 | 0 | 1     | 0.333 | 0.231 | 0.333 | 0.94 | 0.97 | 1 |
| 28 | 0 | 1 | 0 | 0 | 0 | 0 | 0 | 0.667 | 1     | 0.024 | 0.3   | 0.94 | 0.97 | 1 |
| 29 | 0 | 0 | 1 | 0 | 0 | 0 | 0 | 0.333 | 0.667 | 0.817 | 0.267 | 0.93 | 0.96 | 1 |
| 30 | 1 | 0 | 0 | 0 | 0 | 0 | 0 | 1     | 0.333 | 0.609 | 0.233 | 0.93 | 0.96 | 1 |
| 31 | 0 | 1 | 0 | 0 | 0 | 0 | 0 | 0.667 | 1     | 0.402 | 0.2   | 0.92 | 0.95 | 1 |
| 32 | 0 | 0 | 1 | 0 | 0 | 0 | 0 | 0.333 | 0.667 | 1.195 | 0.167 | 0.92 | 0.95 | 1 |
| 33 | 1 | 0 | 0 | 0 | 0 | 0 | 0 | 1     | 0.333 | 0.987 | 0.133 | 0.91 | 0.94 | 1 |
| 34 | 0 | 1 | 0 | 0 | 0 | 0 | 0 | 0.667 | 1     | 0.78  | 0.1   | 0.9  | 0.94 | 1 |
| 35 | 1 | 0 | 0 | 0 | 0 | 0 | 0 | 1.333 | 0.667 | 0.573 | 0.067 | 0.9  | 0.93 | 1 |

What is claimed is:

1. A method for initiating scheduling delivery of data from a plurality of N data sources to N respective data queues, each data queue having a variable occupancy value and a constant decrement rate $D_i$, said method comprising:
at each time step $\Delta t$,
  beginning delivery of one data unit for the first time from only one of said plurality of N data sources to a respective one of said N data queues, wherein said only one of said plurality of N data sources was not previously scheduled for service; or
  in response to all of said N data queues have already exceeded a predetermined high threshold T, skipping an opportunity to move a data unit from any one of said plurality of N data sources to a respective one of said N data queue; or
  in response to at least one of said N data queues is low relative to a predetermined low threshold, delivering one data unit from one of said N data sources to only one of said at least one of said N data queues; and
  selectively choosing one of said beginning, skipping and delivering such that said plurality of N data queues are mathematically guaranteed not to overflow and/or underflow during operation, wherein
  said selectively choosing further includes
    for any time t, computing values of time-dependent variables at time $t+\Delta t$ as follows:
    $C1(t+\Delta t)=S(t)*$ if $(d1(t)=\min\{Kj(t)\}$, then 1, else 0);
    $C2(t+\Delta t)=S(t)*(1-C1(t))*$ if $(d2(t)=\min\{Kj(t)\}$, then 1, else 0);
    $C3(t+\Delta t)=S(t)*(1-C1(t))*(1-C2(t))*$ if $(d3(t)=\min\{Kj(t)\}$, then 1, else 0);
    . . .
    $CN(t+\Delta t)=S(t)*(1-C1(t))*(1-C2(t))* \ldots *(1-CN-1(t))*$ if $(d1(t)=\min\{Kj(t)\}$, then 1, else 0);
    $Qi(t+\Delta t)=$ if (all previous $Ci=0$ and $Ci(t+\Delta t)=0$, then 0, else $Qi(t)-Di+Ci(t+\Delta t)*R$);
    $di(t+\Delta t)=$ if (all previous $Ci=0$ and $Ci(t+\Delta t)=0$, then $R/Di$, else $Qi(t)/Di$);
    $Ki(t+\Delta t)=$ if $(Qi(t+\Delta t)>T$, then $L/Di$, else $di(t+\Delta t))$;
    $S(t+\Delta t)=$ if (all $Qi(t+\Delta t)\leqq T$, then 1, else 0);
    where
      R is the number of data units being transferred from reservoirs of data to said plurality of N data queues,
      $C=(C1,C2,\ldots,CN)$ is the N-element choice vector composed of elements $Ci=1$ or 0, at each time t, each element $Ci(t)$ is 1 if flow i is chosen, else 0;
      $D=(D1,D2,\ldots,DN)$ is the N-element decrement vector of positive constants in which $Di$ is the rate at which data queue i is drained;

$Q=(Q1,Q2,\ldots,QN)$ is the N-element queue occupancy vector in which $Qi(t)$ is the data content of queue i at each time t;

$d=(d1,d2,\ldots,dN)$ is the N-element decrement multiple vector in which $di(t)$ is a mathematical variable for queue i at each time t;

$K=(K1,K2,\ldots,KN)$ is the N-element compare vector in which $Ki(t)$ is a mathematical variable for queue i at each time t;

S is a single mathematical saturation variable for each time t such that $S(t)$ is 0 or 1;

T is a constant number of data unit that is processed per time increment $\Delta t$ at the rate R;

$L=T*\max\{Di\}/\min\{Di\}$; and $S(0)=1$ and all $Ci(0)=Qi(0)=di(0)=Ki(0)=0$ at time $t=0$.

* * * * *